United States Patent
Tanaka

(10) Patent No.: US 9,442,399 B2
(45) Date of Patent: Sep. 13, 2016

(54) ELECTROPHOTOGRAPHIC PHOTOSENSITIVE MEMBER, PROCESS CARTRIDGE, ELECTROPHOTOGRAPHIC APPARATUS AND PHTHALOCYANINE CRYSTAL

(71) Applicant: CANON KABUSHIKI KAISHA, Tokyo (JP)

(72) Inventor: Masato Tanaka, Tagata-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/101,289

(22) Filed: Dec. 9, 2013

(65) Prior Publication Data
US 2014/0170542 A1   Jun. 19, 2014

(30) Foreign Application Priority Data

Dec. 14, 2012  (JP) ................. 2012-273729
Nov. 22, 2013  (JP) ................. 2013-242110

(51) Int. Cl.
G03G 5/06    (2006.01)
G03G 5/047   (2006.01)
C09B 47/04   (2006.01)

(52) U.S. Cl.
CPC ........... G03G 5/047 (2013.01); C09B 47/04 (2013.01); G03G 5/0614 (2013.01); G03G 5/0638 (2013.01); G03G 5/0696 (2013.01)

(58) Field of Classification Search
CPC ... G03G 5/0696; G03G 5/0614; C09B 47/04
USPC ........................ 430/78, 59.4, 59.5
See application file for complete search history.

(56) References Cited

U.S. PATENT DOCUMENTS 5,545,733 A    8/1996  Daimon et al.
5,834,149 A   11/1998  Tambo et al.
6,025,486 A *  2/2000  Mistry et al. ............ 540/122
(Continued)

FOREIGN PATENT DOCUMENTS

CN     1255922 A     6/2000
EP   0 983 274 A1    3/2000
(Continued)

OTHER PUBLICATIONS

English language translation of JP 05-279591 (Oct. 1993).*
(Continued)

*Primary Examiner* — Christopher Rodee
(74) *Attorney, Agent, or Firm* — Fitzpatrick, Cella, Harper & Scinto

(57) ABSTRACT

The photosensitive layer of an electrophotographic photosensitive member contains a phthalocyanine crystal in which a compound represented by the following formula (1) is contained:

Formula (1)

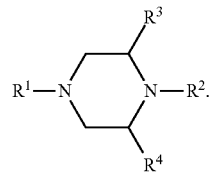

13 Claims, 2 Drawing Sheets

(56) References Cited

U.S. PATENT DOCUMENTS

| | | |
|---|---|---|
| 6,190,811 B1 | 2/2001 | Tanaka et al. |
| 6,248,490 B1 | 6/2001 | Suzuki et al. |
| 6,270,936 B1 | 8/2001 | Tanaka et al. |
| 6,335,132 B1 | 1/2002 | Tanaka et al. |
| 6,340,745 B1 | 1/2002 | Meyer et al. |
| 6,391,505 B1 | 5/2002 | Hamasaki et al. |
| 8,518,615 B2 | 8/2013 | Tanaka et al. |
| 2010/0012553 A1* | 1/2010 | Griffin et al. ............... 208/207 |
| 2010/0094018 A1* | 4/2010 | Nakamura et al. ........... 546/348 |
| 2011/0076614 A1 | 3/2011 | Tanaka |
| 2013/0137025 A1 | 5/2013 | Kawahara et al. |

FOREIGN PATENT DOCUMENTS

| | | | |
|---|---|---|---|
| JP | 05279591 A * | 10/1993 | |
| JP | 07053892 A * | 2/1995 | |
| JP | H0753892 A | 2/1995 | |
| JP | 7-331107 A | 12/1995 | |
| JP | 2000136333 A * | 5/2000 | |
| JP | 2000136333 A | 5/2000 | |
| JP | 2001-40237 A | 2/2001 | |
| JP | 2006-72304 A | 3/2006 | |
| JP | 2009-227692 A | 10/2009 | |
| JP | 2009227692 A | 10/2009 | |
| JP | 2011-94101 A | 5/2011 | |
| WO | 2007/002982 A1 | 1/2007 | |

OTHER PUBLICATIONS

Diamond, Arthur S & David Weiss (eds.) Handbook of Imaging Materials, 2nd ed. New York: Marcel-Dekker, Inc. (Nov. 2001) pp. 145-164.*

English language translation of JP 07-053892 (Feb. 1995).*

English language machine translation of JP 2000-136333 (May 2000).*

U.S. Appl. No. 14/089,717, filed Nov. 25, 2013, Applicants: Tanaka, et al.

European Search Report dated Mar. 27, 2014 n European Application No. 13005723.5.

Li, et al., "Synthesis and photophysical properties of porphyrin-phthalocyanine heterodimer linked by piperazine", Chinese Journal of Chemistry, vol. 16, No. 2, 1998, pp. 97-108.

* cited by examiner

ELECTROPHOTOGRAPHIC PHOTOSENSITIVE MEMBER, PROCESS CARTRIDGE, ELECTROPHOTOGRAPHIC APPARATUS AND PHTHALOCYANINE CRYSTAL

BACKGROUND OF THE INVENTION

1. Field of the Invention

The present invention relates to an electrophotographic photosensitive member, and a process cartridge and an electrophotographic apparatus each having the electrophotographic photosensitive member, and to a phthalocyanine crystal.

2. Description of the Related Art

Since a semiconductor laser commonly used in an image exposing device of an electrophotographic photosensitive member has a long oscillation wavelength in the range of 650 to 820 nm, electrophotographic photosensitive members having high sensitivity to light in the long wavelength range are currently under development.

Phthalocyanine pigments are effective as charge generating substances having high sensitivity to the light ranging to such a long wavelength region. Oxytitanium phthalocyanine and gallium phthalocyanine in particular have excellent sensitivity properties, and various crystal forms have been reported until now.

Although an electrophotographic photosensitive member using a phthalocyanine pigment has excellent sensitivity properties, a problem is that the generated photo carriers tend to remain in a photosensitive layer so as to act as a memory, easily causing potential variation such as ghosting.

Japanese Patent Application Laid-Open No. 2001-40237 discloses that the addition of a specific organic electron acceptor to a phthalocyanine pigment during acid pasting has a sensitizing effect. The method has, however, problems that the additive (organic electron acceptor) may cause chemical change and that the transformation into a desired crystal form is difficult in some cases.

Japanese Patent Application Laid-Open No. 2006-72304 discloses that wet crushing treatment of a pigment and a specific organic electron acceptor allows for simultaneous crystal transformation and incorporation of the organic electron acceptor in the surface of the crystal, resulting in improved electrophotographic properties.

Japanese Patent Application Laid-Open No. H07-331107 discloses a hydroxygallium phthalocyanine crystal which contains a polar organic solvent. With use of a transformation solvent such as N,N-dimethylformamide, a polar organic solvent is incorporated in the crystal, so that a crystal having excellent sensitivity properties is produced.

Various attempts have been made to improve electrophotographic photosensitive members as described above. For further improvement in high-quality image in recent years, it is desired to prevent image degradation due to ghosting in various environments. In the method according to Japanese Patent Application Laid-Open No. 2006-72304, the organic electron acceptors are not sufficiently contained in the produced phthalocyanine crystal, being in a simple mixture state or attached to the surface. Thus, there is a need for improvement. In the method according to Japanese Patent Application Laid-Open No. H07-331107, it was found that the generated photo carriers tend to remain in a photosensitive layer so as to act as a memory, easily causing ghosting in some cases.

SUMMARY OF THE INVENTION

An object of the present invention is to provide an electrophotographic photosensitive member which can output images with reduced image defects due to ghosting not only under a normal temperature and normal humidity environment but also even under a low temperature and low humidity environment, especially severe conditions. Another object of the present invention is to provide a process cartridge and an electrophotographic apparatus each having the electrophotographic photosensitive member.

A still another object of the present invention is to provide a phthalocyanine crystal in which a specific piperazine compound is contained.

The present invention provides an electrophotographic photosensitive member including: a support; and a photosensitive layer formed on the support; wherein the photosensitive layer includes a phthalocyanine crystal in which a compound represented by the following formula (1) is contained:

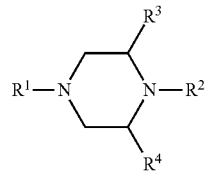

Formula (1)

wherein $R^1$ to $R^4$ each independently represent a hydrogen atom, a formyl group, an acetyl group, an alkenyl group, a substituted or unsubstituted alkyl group, a substituted or unsubstituted aryl group, or a substituted or unsubstituted heterocyclic group, provided that both of the $R^1$ and $R^2$ are not a hydrogen atom at the same time, and provided that the substituent of the substituted aryl group is not an acetyl group or a benzoyl group.

The present invention also provides a process cartridge detachably attachable to a main body of an electrophotographic apparatus, wherein the process cartridge integrally supports the electrophotographic photosensitive member and at least one device selected from the group consisting of a charging device, a developing device, a transfer device and a cleaning device.

The present invention also provides an electrophotographic apparatus having the electrophotographic photosensitive member, with a charging device, an image exposing device, a developing device and a transfer device.

The present invention also provides a phthalocyanine crystal which contains a compound represented by the following formula (1) in the crystal.

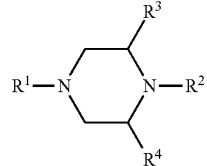

Formula (1)

wherein $R^1$ to $R^4$ each independently represent a hydrogen atom, a formyl group, an acetyl group, an alkenyl group, a substituted or unsubstituted alkyl group, a substituted or unsubstituted aryl group, or a substituted or unsubstituted heterocyclic group, provided that both of the $R^1$ and $R^2$ are not a hydrogen atom at the same time, and provided that the substituent of the substituted aryl group is not an acetyl group or a benzoyl group.

The present invention can provide an electrophotographic photosensitive member which can output images with reduced image defects due to ghosting not only under a normal temperature and normal humidity environment but also even under a low temperature and low humidity environment, especially severe conditions. The present invention can also provide a process cartridge and an electrophotographic apparatus each having the electrophotographic photosensitive member.

The present invention can also provide a phthalocyanine crystal having excellent properties as a charge generating substance.

Further features of the present invention will become apparent from the following description of exemplary embodiments with reference to the attached drawings.

DESCRIPTION OF THE EMBODIMENTS

Figure 1:
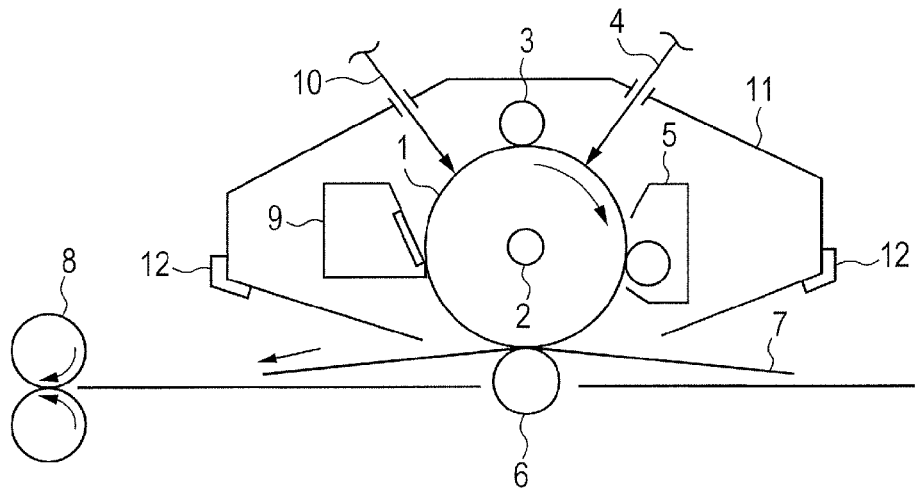
FIG. 1 is a schematic view of an electrophotographic apparatus provided with a process cartridge having an electrophotographic photosensitive member.

Preferred embodiments of the present invention will now be described in detail in accordance with the accompanying drawings.

As described above, an electrophotographic photosensitive member of the present invention includes a support and a photosensitive layer formed on the support, wherein the photosensitive layer includes a phthalocyanine crystal in which a compound represented by the following formula (1) is contained:

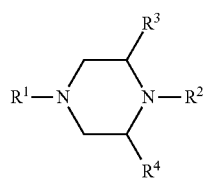

Formula (1)

In the formula (1), $R^1$ to $R^4$ each independently represent a hydrogen atom, a formyl group, an acetyl group, an alkenyl group, a substituted or unsubstituted alkyl group, a substituted or unsubstituted aryl group, or a substituted or unsubstituted heterocyclic group, provided that both of the $R^1$ and $R^2$ are not a hydrogen atom at the same time, and provided that the substituent of the substituted aryl group is not an acetyl group or a benzoyl group.

The $R^1$ to $R^4$ in the formula (1) can be a hydrogen atom (provided that both of the $R^1$ and $R^2$ are not a hydrogen atom at the same time), a formyl group, an alkenyl group, a substituted or unsubstituted alkyl group, a substituted or unsubstituted aryl group, or a substituted or unsubstituted heterocyclic group.

Examples of the substituent of the substituted alkyl group include an alkoxy group, a morpholinoalkoxy group, a dialkylamino group, an alkoxycarbonyl group, a substituted or unsubstituted aryl group, an aryloxy group, a heterocyclic group, a halogen atom, a cyano group and a morpholino group. Examples of the substituent of the substituted aryl group include a substituted or unsubstituted alkyl group, an alkoxy group, a dialkylamino group, an alkoxycarbonyl group, a halogen atom, a hydroxy group, a nitro group, a cyano group, a formyl group and a morpholino group. Examples of the substituent of the substituted heterocyclic group include an alkyl group, an alkoxy group, a dialkylamino group, an alkoxycarbonyl group, a halogen atom, a hydroxy group, a nitro group, a cyano group, a formyl group and a morpholino group.

The $R^3$ and $R^4$ in the formula (1) can be a hydrogen atom.

At least one of the $R^1$ to $R^4$ in the formula (1) can be a substituted or unsubstituted aryl group or a substituted or unsubstituted heterocyclic group. It is more preferred that at least one of $R^1$ to $R^4$ be a substituted or unsubstituted phenyl group or a substituted or unsubstituted pyridyl group among them.

Examples of the substituent of the substituted phenyl group include a substituted or unsubstituted alkyl group, an alkoxy group, a dialkylamino group, an alkoxycarbonyl group, a halogen atom, a hydroxy group, a nitro group, a cyano group, a formyl group and a morpholino group. Examples of the substituent of the substituted pyridyl group include an alkyl group, an alkoxy group, a dialkylamino group, an alkoxycarbonyl group, a halogen atom, a hydroxy group, a nitro group, a cyano group, a formyl group and a morpholino group. Among the above substituents of the substituted phenyl group and the substituted pyridyl group, a halogen atom, a hydroxy group, a cyano group, a nitro group, a formyl group, an alkyl group and an alkoxy group are particularly preferred.

At least one of the $R^1$ and $R^2$ in the formula (1) can be the substituted or unsubstituted alkyl group. It is more preferred that the substituent of the substituted alkyl group be a halogen atom, a dialkylamino group or a phenyl group among the above substituents. A methyl group and an ethyl group are particularly preferred among them.

It is more preferred that the $R^1$ and $R^2$ in the formula (1) be the same group.

The alkyl group in the formula (1) includes a straight-chain or branched alkyl group.

Examples of the alkenyl group in the formula (1) include a 2-propenyl group, a 1-cyclohexenyl group and a 1-cyclopentenyl group.

Examples of the aryl group in the formula (1) include a phenyl group, a naphthyl group and a biphenyl group.

Examples of the heterocyclic group in the formula (1) include a pyridyl group, a pyrimidinyl group, an imidazolyl group, a pyrazinyl group, a pyridazinyl group, a triazinyl group, a quinolyl group, an acridinyl group, a phenazinyl group, a carbazolyl group, an indolyl group, a quinoxalinyl group, a thiazolyl group, a thiadiazolyl group, an oxazolyl group, a furazanyl group, a benzofuranyl group, a phenoxathiinyl group, a thianthrenyl group, a thienyl group and a furyl group.

Examples of the substituent of the substituted alkyl group in the formula (1) include an alkoxy group such as a methoxy group, an ethoxy group and a 2-(morpholino)-ethoxy group; a dialkylamino group such as a dimethylamino group and a diethylamino group; an alkokycarbonyl group such as a methoxycarbonyl group and an ethoxycarbonyl group; an aryl group such as a phenyl group, a naphthyl group, a biphenylyl group, a nitrophenyl group, a tolyl group, a bromophenyl group, a cyanophenyl group and a methoxyphenyl group which may have a substituent such as a halogen atom, a hydroxy group, a carboxy group, a nitro group, a cyano group, a formyl group and an alkoxy group; a heterocyclic group such as a pyridyl group, a pyrimidinyl group, an imidazolyl group, a pyrazinyl group, a pyridazinyl group, a triazinyl group, a quinolyl group, an acridinyl group, a phenazinyl group, a carbazolyl group, an indolyl group, a quinoxalinyl group, a thiazolyl group, a thiadiazolyl group, an oxazolyl group, a furazanyl group, a benzofuranyl group, a phenoxathiinyl group, a thianthrenyl group, a thienyl group, a furyl group, an ethylpyridyl group, a chlorothiadiazolyl group and a formyloxazolyl group which may have a substituent such as a halogen atom, a hydroxy group, a nitro group, a cyano group, a formyl group and an alkoxy group; a halogen atom such as a fluorine atom, a chlorine atom and a bromine atom; a hydroxy group; a cyano group; and a morpholino group.

Examples of the substituent of the substituted aryl group in the formula (1) include an alkyl group such as a methyl group, an ethyl group and a propyl group; an alkoxy group such as a methoxy group and an ethoxy group; an aralkyl group such as a phenylmethyl group, a diphenylmethyl group and a phenylethyl group; a dialkylamino group such as a dimethylamino group and a diethylamino group; an alkoxycarbonyl group such as a methoxycarbonyl group and an ethoxycarbonyl group; a halogen atom such as a fluorine atom, a chlorine atom and a bromine atom; a hydroxy group; a carboxy group; an acetylamino group; a nitro group; a cyano group; and a formyl group.

Examples of the substituent of the substituted heterocyclic group in the formula (1) include an alkyl group such as a methyl group and an ethyl group; an alkoxy group such as a methoxy group and an ethoxy group; a dialkylamino group such as a dimethylamino group and a diethylamino group; a halogen atom such as a fluorine atom, a chlorine atom and a bromine atom; a hydroxy group; a nitro group; a cyano group; and a formyl group.

Although preferred specific examples (exemplary compounds) of the compound represented by the formula (1) contained in the phthalocyanine crystal of the present invention are described in the following, the present invention is not limited thereto.

Exemplary compound (1)

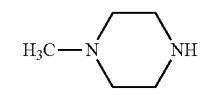

Exemplary compound (2)

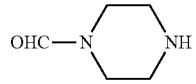

Exemplary compound (3)

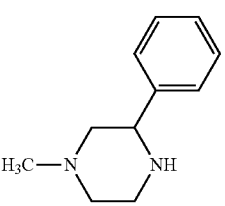

Exemplary compound (4)

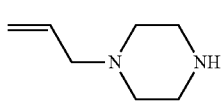

Exemplary compound (5)

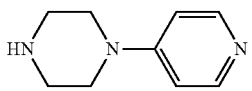

Exemplary compound (6)

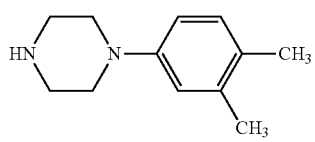

Exemplary compound (7)

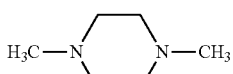

Exemplary compound (8)

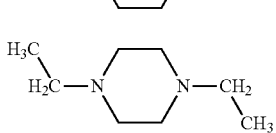

Exemplary compound (9)

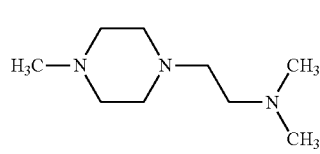

Exemplary compound (10)

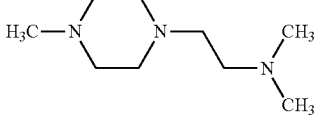

Exemplary compound (11)

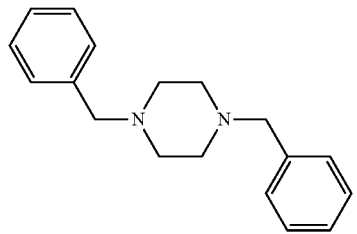

Exemplary compound (12)

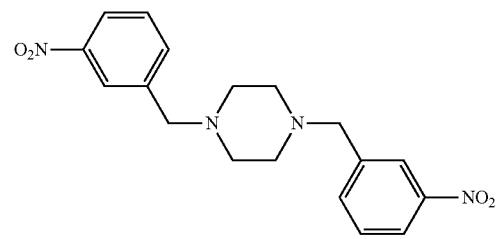

Exemplary compound (13)

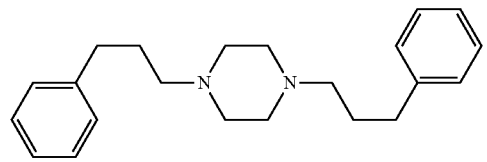

Exemplary compound (14)

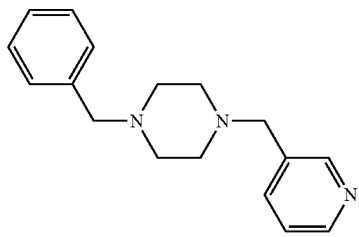

Exemplary compound (23)

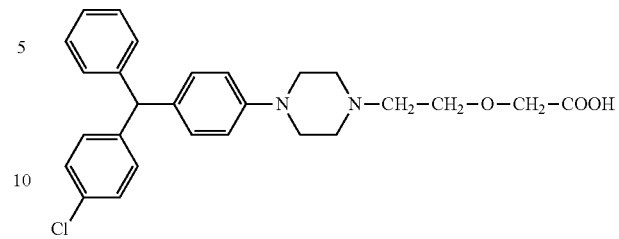

Exemplary compound (15)

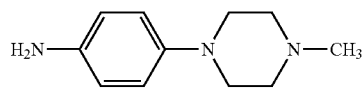

Exemplary compound (24)

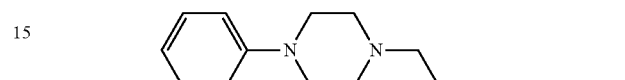

Exemplary compound (16)

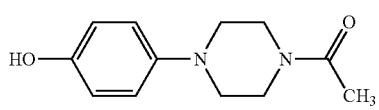

Exemplary compound (25)

Exemplary compound (17)

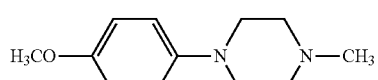

Exemplary compound (26)

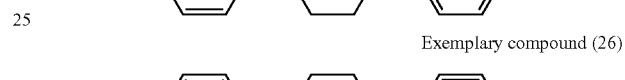

Exemplary compound (18)

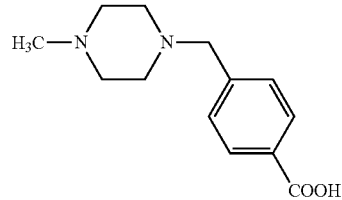

Exemplary compound (27)

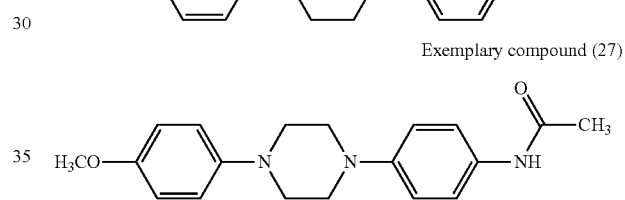

Exemplary compound (19)

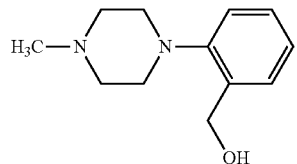

Exemplary compound (28)

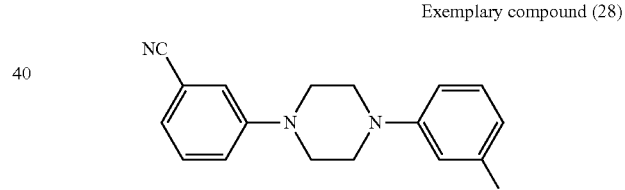

Exemplary compound (20)

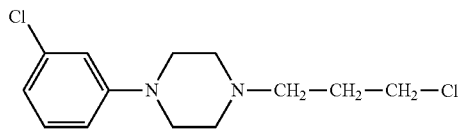

Exemplary compound (29)

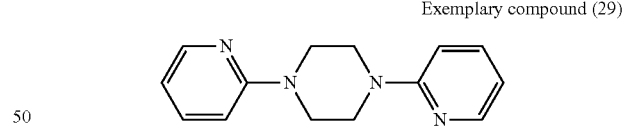

Exemplary compound (21)

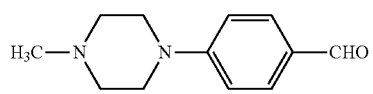

Exemplary compound (30)

Exemplary compound (22)

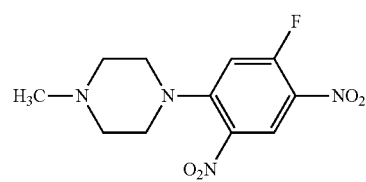

Exemplary compound (31)

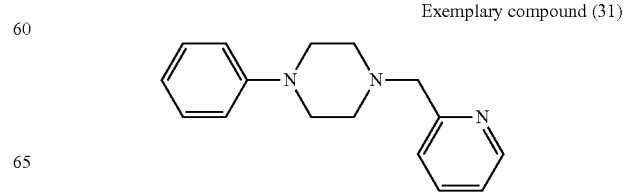

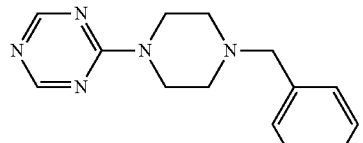

Exemplary compound (32)

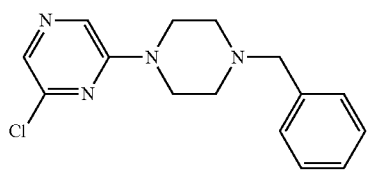

Exemplary compound (33)

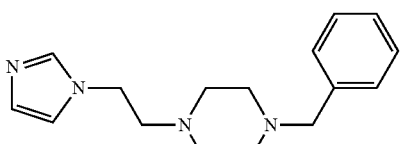

Exemplary compound (34)

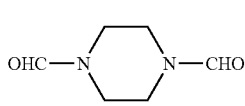

Exemplary compound (35)

Examples of the phthalocyanine which constitutes the phthalocyanine crystal which contains a compound represented by the formula (1) of the present invention in the crystal include a metal-free phthalocyanine and a metal phthalocyanine which may have an axial ligand, and the phthalocyanine may have a substituent. An oxytitanium phthalocyanine crystal and a gallium phthalocyanine crystal are preferred in particular, being effective for the present invention, with excellent light sensitivity, while easily causing ghosting.

As described below, examples of the gallium phthalocyanine to constitute the gallium phthalocyanine crystal which contains a compound represented by the formula (1) of the present invention in the crystal include a gallium phthalocyanine molecule of which gallium atom has an axial ligand of a halogen atom, a hydroxy group or an alkoxy group. The phthalocyanine ring may have a substituent such as a halogen atom.

A gallium phthalocyanine crystal further containing N,N-dimethylformamide in the crystal is preferred.

Among gallium phthalocyanine crystals, a hydroxygallium phthalocyanine crystal, a bromo-gallium phthalocyanine crystal and an iodo-gallium phthalocyanine crystal, having excellent sensitivity, are preferred, being effective for the present invention, and a hydroxygallium phthalocyanine crystal is preferred in particular. The hydroxygallium phthalocyanine crystal includes a gallium atom having an axial ligand of hydroxy group. The bromo-gallium phthalocyanine crystal includes a gallium atom having an axial ligand of bromine atom. The iodo-gallium phthalocyanine crystal includes a gallium atom having an axial ligand of iodine atom.

Among hydroxygallium phthalocyanine crystals, a hydroxygallium phthalocyanine crystal having peaks at Bragg angles 2θ of 7.4°±0.3° and 28.3°±0.3° in X-ray diffraction with CuKα radiation in particular is more preferred, having effect of reducing image defects due to ghosting.

The content of an amine compound represented by the formula (1) contained in the phthalocyanine crystal can be 0.1% by mass or more and 3.0% by mass or less.

In the phthalocyanine crystal which contains a compound represented by the formula (1) in the crystal, the compound represented by the formula (1) is incorporated into the crystal.

A manufacturing method for a phthalocyanine crystal which contains a compound represented by the formula (1) in the crystal is described below.

The phthalocyanine crystal which contains a compound represented by the formula (1) of the present invention in the crystal can be obtained by mixing phthalocyanine produced by acid pasting and a compound represented by the formula (1) with a solvent and by wet milling treatment for conversion into crystals.

The milling treatment is a treatment in a milling device such as a sand mill and a ball mill, using dispersion material such as glass beads, steel beads and alumina balls. The milling time can be about 10 to 60 hours. In a particularly preferred method, sampling is performed with an interval of 5 to 10 hours for examining the Bragg angle of the crystal. The amount of dispersion material in milling treatment can be 10 to 50 times the amount of gallium phthalocyanine by mass. Examples of the solvent for use include an amide solvent such as N,N-dimethylformamide, N,N-dimethylacetoamide, N-methylformamide, N-methylacetoamide, N-methylpropionamide and N-methyl-2-pyrrolidone, a halogen solvent such as chloroform, an ether solvent such as tetrahydrofuran, a sulfoxide solvent such as dimethyl sulfoxide. The amount of solvent used can be 5 to 30 times the amount of phthalocyanine by mass. The amount of a compound represented by the formula (1) used can be 0.1 to 30 times the amount of phthalocyanine by mass.

In the present invention, the measurement data of the obtained phthalocyanine crystal by NMR measurement and thermogravimetric (TG) measurement are analyzed to determine whether the phthalocyanine crystal of the present invention contained a compound represented by the formula (1) in the crystal.

For example, when a milling treatment was performed with a solvent for dissolving a compound represented by the formula (1) or when a cleaning was performed after milling, NMR measurement of the obtained phthalocyanine crystal was performed. When a compound represented by the formula (1) was detected, it was determined that a compound represented by the formula (1) was contained in the crystal.

On the other hand, when a compound represented by the formula (1) was insoluble in the solvent for use in the milling treatment and insoluble in the cleaning solvent after milling, NMR measurement of the obtained phthalocyanine crystal was performed. When a compound represented by the formula (1) was detected, determination was performed by the following method.

The TG measurement of each of the phthalocyanine crystal obtained by adding a compound represented by the formula (1), a phthalocyanine crystal prepared in the same way except that no compound represented by the formula (1) was added, and a compound represented by the formula (1) alone was individually performed. When the TG measurement results of the phthalocyanine crystal obtained by adding a compound represented by the formula (1) were interpreted as a mixture of the individual measurement results of the phthalocyanine crystal prepared without addition of a compound represented by the formula (1) and a compound represented by the formula (1) in a predetermined ratio, it was determined that the phthalocyanine crystal and a compound represented by the formula (1) formed a simple mixture or that a compound represented by the formula (1) was attached to the surface of the phthalocyanine crystal.

On the other hand, when the TG measurement results of the phthalocyanine crystal obtained by adding a compound represented by the formula (1) showed the weight reduction increase at a temperature higher than the completion temperature of the weight reduction for the compound represented by the formula (1) alone in comparison with the TG measurement results of the phthalocyanine crystal prepared without addition of a compound represented by the formula (1), it was determined that a compound represented by the formula (1) was contained in the crystal.

The TG measurement, the X-ray diffraction analysis and the NMR measurement of the phthalocyanine crystal of the present invention were performed under the following conditions.

[TG Measurement]
Measurement instrument: A simultaneous TG/DTA measurement device made by Seiko Instruments Inc. (Trade name: TG/DTA 220U)
Atmosphere: Nitrogen stream (300 cm$^3$/min)
Measurement range: 35° C. to 600° C.
Rate of temperature increase: 10° C./min

[Powder X-Ray Diffraction Analysis]
Measurement instrument: X-ray diffraction analyzer RINT-TTRII made by Rigaku Corporation
X-ray tube: Cu
X-ray tube voltage: 50 KV
X-ray tube current; 300 mA
Scanning method: 2θ/θ scan
Scanning rate: 4.0°/min
Sampling interval: 0.02°
Starting angle (2θ): 5.0°
Stopping angle (2θ): 40.0°
Attachment: Standard sample holder
Filter: non-use
Incident monochrome: in-use
Counter monochrometer: non-use
Divergence slit: open
Vertical divergence limiting slit: 10.00 mm
Scattering slit: open
Light receiving slit: open
Flat plate monochrometer: in-use
Counter: scintillation counter

[NMR Measurement]
Measurement instrument: AVANCE III 500 made by Bruker
Solvent: deuterium sulfate ($D_2SO_4$)

The phthalocyanine crystal which contains a compound represented by the formula (1) of the present invention in the crystal has an excellent function as a photoconductive material, and is applicable to a solar cell, a sensor, a switching device and the like, in addition to an electrophotographic photosensitive member.

The use of the phthalocyanine crystal in which a compound represented by the formula (1) of the present invention is contained as a charge generating substance of an electrophotographic photosensitive member is described in the following.

A photosensitive layer includes: a single-layer type photosensitive layer having a single layer which contains a charge generating substance and a charge transporting substance; and a laminate type photosensitive layer having a lamination structure of a charge generating layer which contains a charge generating substance and a charge transporting layer which contains a charge transporting substance. The lamination sequence of the charge generating layer and the charge transporting layer may be inverted.

A support having electrical conductivity (conductive support) is suitable for use in the present invention. The support may be made of, for example, aluminum, aluminum alloy, copper, zinc, stainless steel, vanadium, molybdenum, chromium, titanium, nickel, indium, gold or platinum. Alternatively, a support may be made of a plastic (e.g. polyethylene, polypropylene, polyvinylchloride, polyethylene terephthalate, acrylic resin and polyfluoroethylene) coated with a vacuum deposited layer of aluminum, aluminum alloy, indium oxide, tin oxide or indium oxide-tin oxide alloy; a plastic or the plastic support coated with conductive particles (e.g. aluminum particles, titanium oxide particles, tin oxide particles, zinc oxide particles, carbon black and silver particles) and a binder resin; a plastic or paper support impregnated with conductive particles; a plastic including a conductive polymer or the like.

In the present invention, an undercoat layer (also referred to as a barrier layer or an intermediate layer) having a barrier function and an adhesive function may be disposed between the support and the photosensitive layer.

The undercoat layer can be made from a raw material such as polyvinyl alcohol, polyethylene oxide, ethyl cellulose, methyl cellulose, casein, polyamide (e.g. nylon 6, nylon 66, nylon 610, a copolymer nylon, N-alkoxymethylated nylon), polyurethane, glue, aluminum oxide and gelatin. The undercoat layer has a film thickness of 0.1 to 10 μm, preferably 0.5 to 5 μm.

A single-layer type photosensitive layer can be formed by mixing the charge generating substance of phthalocyanine crystal of the present invention and the charge transporting substance in a binder resin solution, applying the mixed liquid to a support, and drying the produced coating film.

The charge generating layer of a laminate type photosensitive layer can be formed by dispersing phthalocyanine crystals of the present invention in a binder resin solution so as to prepare the coating liquid for forming a charge generating layer, applying the coating liquid, and drying the produced coating film. Alternatively the charge generating layer may be formed by vapor deposition.

The charge transporting layer can be formed by applying a coating liquid for forming a charge transporting layer and drying the produced coating film. The coating liquid for forming a charge transporting layer is obtained by dissolving a charge transporting substance and a binding resin in a solvent.

Examples of the charge transporting substance include a triarylamine-based compound, a hydrazine-based compound, a stilbene-based compound, a pyrazoline-based compound, an oxazole-based compound, a thiazole-based compound and a triallylmethane-based compound.

Examples of the binding resin for use in each layer include polyester, an acrylic resin, polyvinylcarbazole, a phenoxy resin, polycarbonate, polyvinylbutyral, polystyrene, polyvinyl acetate, polysulfone, polyarylate, vinylidene chloride, acrylonitrile copolymer and polyvinyl benzal.

Examples of the application method to form a photosensitive layer include dip coating, spray coating, spinner coating, bead coating, blade coating and beam coating.

A single-layer type photosensitive layer can have a film thickness of 5 to 40 μm, more preferably 10 to 30 μm.

The charge generating layer of a laminate type photosensitive layer can have a film thickness of 0.01 to μm, more preferably 0.1 to 3 μm. The charge transporting layer can have a film thickness of 5 to 40 μm, more preferably 10 to 30 μm.

The content of the charge generating substance of a laminate type photosensitive layer can be 20 to 90% by mass relative to the total mass of the charge generating layer, more preferably 50 to 80% by mass. The content of the charge transporting substance can be 20 to 80% by mass relative to the total mass of the charge transporting layer, more preferably 30 to 70% by mass.

The content of the charge generating substance of a single-layer type photosensitive layer can be 3 to 30% by mass relative to the total mass of the photosensitive layer. The content of the charge transporting substance can be 30 to 70% by mass relative to the total mass of the photosensitive layer.

The phthalocyanine crystal of the present invention may be mixed with another charge generating substance for use as charge generating substance. In that case, the content of the phthalocyanine crystal can be 50% by mass or more relative to the total charge generating substance.

A protective layer may be provided on the photosensitive layer on an as needed basis. The protective layer can be formed by applying a coating liquid for forming a protective layer, which is prepared by dissolving a resin in an organic solvent, on the photosensitive layer, and drying the produced coating film. Examples of the resin for use in the protective layer include polyvinylbutyral, polyester, polycarbonate (e.g., polycarbonate Z and modified polycarbonate), nylon, polyimide, polyarylate, polyurethane, a styrene-butadiene copolymer, a styrene-acrylic acid co-polymer and a styrene-acrylonitrile co-polymer. The protective layer can have a film thickness of 0.05 to 20 μm.

The protective layer may contain conductive particles or an ultraviolet absorbing agent. Examples of the conductive particles include metal oxide particles such as tin oxide particles.

FIG. 1 is a schematic view of an electrophotographic apparatus provided with a process cartridge having an electrophotographic photosensitive member of the present invention.

An electrophotographic photosensitive member 1 having a cylindrical shape (drum shape), is rotation driven around an axis 2 at a predetermined circumferential speed (process speed) in an arrow direction.

The surface of the electrophotographic photosensitive member 1 is electrostatically charged to a positive or negative predetermined potential with a charging device 3 during in a rotation process. Subsequently the charged surface of the electrophotographic photosensitive member 1 is irradiated with image exposing light 4 from an image exposing device (not drawn in figure) so as to form an electrostatic latent image corresponding to objective image information. The image exposing light 4 are intensity-modulated in response to the time-series electric digital image signals of objective image information, outputted from, for example, an image exposing device for slit exposing or exposing with scanning laser beams.

The electrostatic latent image formed on the surface of the electrophotographic photosensitive member 1 is developed (normal development or reversal development) with toner stored in a developing device 5 so as to form a toner image on the surface of the electrophotographic photosensitive member 1. The toner image formed on the surface of the electrophotographic photosensitive member 1 is transferred to a transfer material 7 with a transfer device 6. On this occasion, a bias voltage having a polarity reversal of the charge retained on the toner is applied to the transfer device 6 from a bias power supply (not drawn in figure). A transfer material 7 of paper is taken out from a paper feeding part (not drawn in figure) so as to be fed between the electrophotographic photosensitive member 1 and the transfer device 6 in synchronization with the rotation of the electrophotographic photosensitive member 1.

The transfer material 7 having a toner image transferred from the electrophotographic photosensitive member 1 is separated from the surface of the electrophotographic photosensitive member 1 and transported to an image fixation device 8 for the fixation of the toner image. An image formed object (print or copy) is thus printed out from an electrophotographic apparatus.

After transfer of the toner image to the transfer material 7, the surface of the electrophotographic photosensitive member 1 is cleaned with a cleaning device 9 to remove attached material such as toner (remaining toner after transfer). In a recently developed cleaner-less system, toner may be directly removed after transfer with a development apparatus or the like. Subsequently the surface of the electrophotographic photosensitive member 1 is neutralized with pre-exposing light 10 from a pre-exposing device (not drawn in figure) and then repeatedly used for image formation. The pre-exposing device is not necessarily required for a contact charging device 3 having a charging roller.

A plurality of components selected from the group consisting of the electrophotographic photosensitive member 1, a charging device 3, a developing device 5 and a cleaning device 9 may be contained in a container and integrally supported to form a process cartridge detachable to an electrophotographic apparatus body. For example, at least one selected from the group consisting of a charging device 3, a developing device 5 and a cleaning device 9 is integrally supported together with the electrophotographic photosensitive member 1 so as to form a cartridge. The cartridge constitutes a process cartridge 11 detachable to an electrophotographic apparatus body with a guiding device 12 such as a rail of the electrophotographic apparatus body.

Image exposing light 4 may be reflected beams from or transmitted beams through a sheet of manuscript for an electrophotographic apparatus such as a copy machine and a printer. Alternatively, image exposing light 4 may be radiated beams produced by scanning of laser beams, driving of an LED array or driving of a liquid crystal shutter array in response to signals from a manuscript reading sensor.

The electrophotographic photosensitive member 1 of the present invention can be widely used in an electrophotography application field such as a laser beam printer, a CRT printer, an LED printer, a FAX, a liquid crystal printer and a laser engraving.

EXAMPLES

The present invention is described further in detail in reference to specific Examples in the following, although the present invention is not limited thereto.

In the following, "parts" means "parts by mass". The film thickness of each of the layers of electrophotographic photosensitive members in Examples and Comparative Examples was obtained with an eddy-current film thickness meter (Fischerscope made by Fischer Instruments K.K.), or based on the specific gravity converted from a mass per unit area, although the present invention is not limited thereto.

Example 1-1

Figure 2:
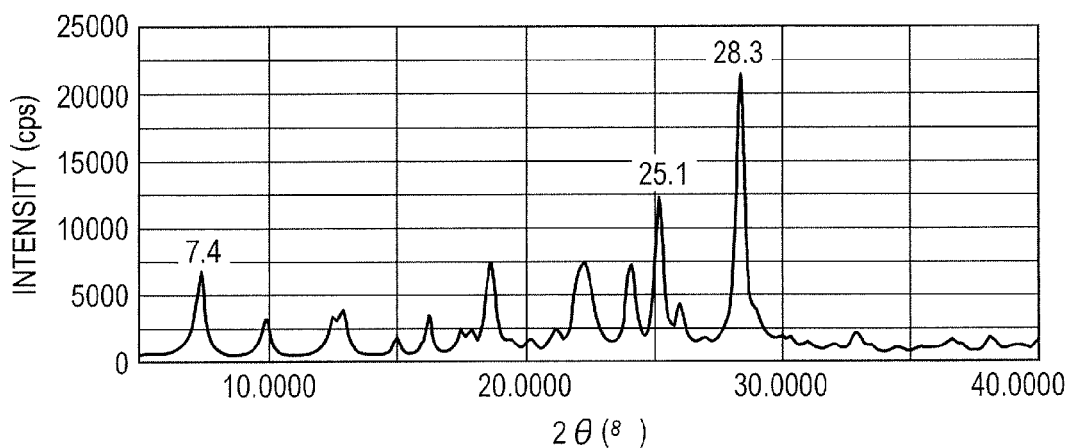
FIG. 2 is a powder X-ray diffraction chart of a hydroxygallium phthalocyanine crystal obtained in Example 1-1.

Hydroxygallium phthalocyanine was prepared by the same treatment as in the synthesis example 1 and the subsequent example 1-1 described in Japanese Patent Application Laid-Open No. 2011-94101. Then, 0.5 parts of the hydroxygallium phthalocyanine, 1.0 part of the exemplary compound (7) (product code: D0787, made by Tokyo Chemical Industry Co., Ltd.), and 9.5 parts of N,N-dimethylformamide were put in a ball mill with 15 parts of glass beads having a diameter of 0.8 mm so as to be milled at room temperature (23° C.) for 48 hours. A hydroxygallium phthalocyanine crystal was produced from the dispersion liquid using N,N-dimethylformamide. In filtration, the strainer was sufficiently cleaned with tetrahydrofuran. The filter residue was vacuum dried so that 0.49 parts of hydroxygallium phthalocyanine crystal was obtained. The powder X-ray diffraction chart of the produced hydroxygallium phthalocyanine crystal is illustrated in FIG. 2.

By NMR measurement, it was confirmed based on the conversion from proton ratio that 0.52% by mass of the exemplary compound (7) and 2.08% by mass of N,N-dimethylformamide were contained in the hydroxygallium phthalocyanine crystal. Since the exemplary compound (7) is liquid and compatible with N,N-dimethylformamide, it was found that the exemplary compound (7) was contained in the phthalocyanine crystal.

Example 1-2

Except that 1.0 part of the exemplary compound (7) in Example 1-1 was replaced with 1.0 part of the exemplary compound (9) (product code: D1766, made by Tokyo Chemical Industry Co., Ltd.), 0.46 parts of hydroxygallium phthalocyanine crystal was obtained by the same treatment as in Example 1-1. The powder X-ray diffraction chart of the produced crystal was the same as in FIG. 2.

By NMR measurement, it was confirmed that 0.65% by mass of the exemplary compound (9) and 1.86% by mass of N,N-dimethylformamide were contained in the hydroxygallium phthalocyanine crystal. Since the exemplary compound (9) is liquid and compatible with N,N-dimethylformamide, it was found that the exemplary compound (9) was contained in the hydroxygallium phthalocyanine crystal.

Example 1-3

Except that 1.0 part of the exemplary compound (7) in Example 1-1 was replaced with 1.0 part of the exemplary compound (3) (product code: M1685, made by Tokyo Chemical Industry Co., Ltd.), 0.44 parts of hydroxygallium phthalocyanine crystal was obtained by the same treatment as in Example 1-1. The powder X-ray diffraction chart of the produced crystal was the same as in FIG. 2.

By NMR measurement, it was confirmed that 0.63% by mass of the exemplary compound (3) and 1.91% by mass of N,N-dimethylformamide were contained in the hydroxygallium phthalocyanine crystal. Since the exemplary compound (3) was a solid soluble in N,N-dimethylformamide, it was found that the exemplary compound (3) was contained in the hydroxygallium phthalocyanine crystal.

Example 1-4

Figure 3:
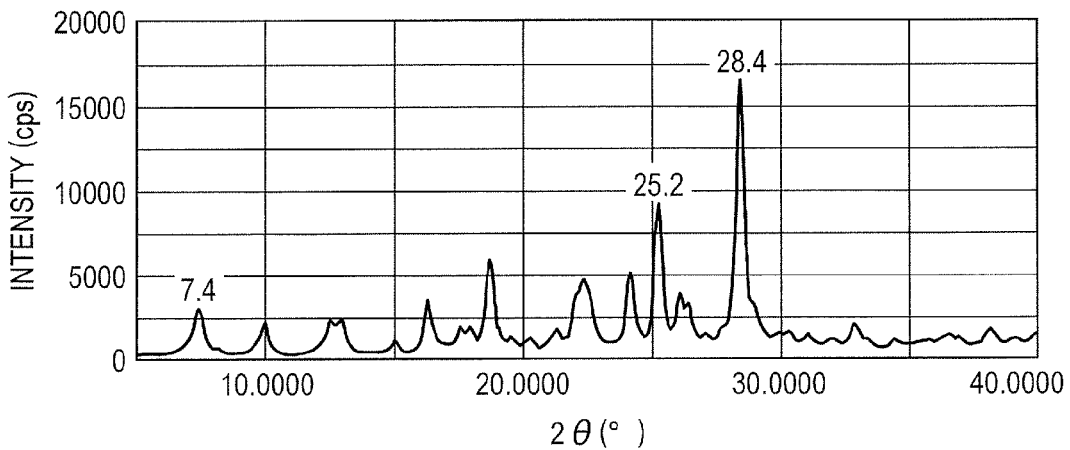
FIG. 3 is a powder X-ray diffraction chart of a hydroxygallium phthalocyanine crystal obtained in Example 1-4.

Except that 1.0 part of the exemplary compound (7) in Example 1-1 was replaced with 0.5 parts of the exemplary compound (29) (product code: D2635, made by Tokyo Chemical Industry Co., Ltd.), 0.48 parts of hydroxygallium phthalocyanine crystal was obtained by the same treatment as in Example 1-1. The powder X-ray diffraction chart of the produced crystal is illustrated in FIG. 3.

By NMR measurement, it was confirmed that 0.30% by mass of the exemplary compound (29) and 1.66% by mass of N,N-dimethylformamide were contained in the hydroxygallium phthalocyanine crystal. Since the exemplary compound (29) was a solid soluble in N,N-dimethylformamide, it was found that the exemplary compound (29) was contained in the hydroxygallium phthalocyanine crystal.

Example 1-5

Figure 4:
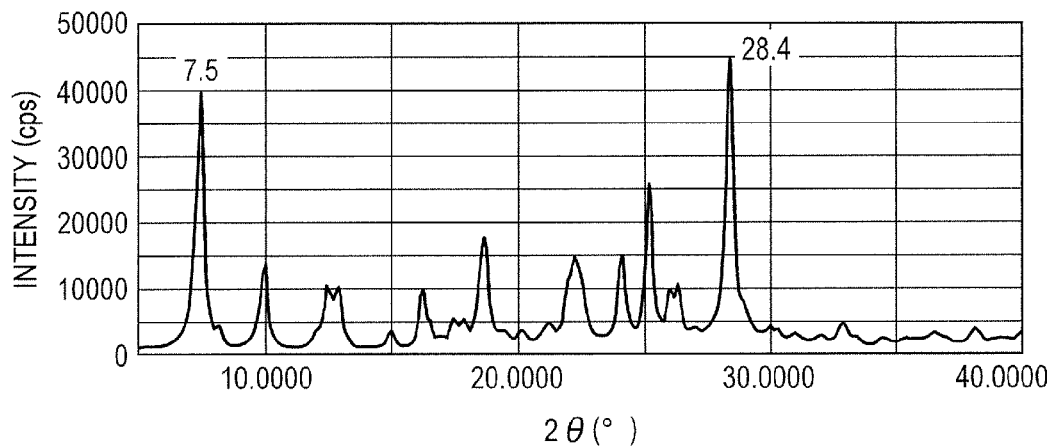
FIG. 4 is a powder X-ray diffraction chart of a hydroxygallium phthalocyanine crystal obtained in Example 1-5.

Except that 1.0 part of the exemplary compound (7) in Example 1-1 was replaced with 0.5 parts of the exemplary compound (25), 0.45 parts of hydroxygallium phthalocyanine crystal was obtained by the same treatment as in Example 1-1. The powder X-ray diffraction chart of the produced crystal is illustrated in FIG. 4.

By NMR measurement, it was confirmed that 0.36% by mass of the exemplary compound (25) and 1.91% by mass of N,N-dimethylformamide were contained in the hydroxygallium phthalocyanine crystal. Since the exemplary compound (25) was a solid soluble in N,N-dimethylformamide, it was found that the exemplary compound (25) was contained in the hydroxygallium phthalocyanine crystal.

Example 1-6

Except that 1.0 part of the exemplary compound (7) in Example 1-1 was replaced with 1.0 part of the exemplary compound (25), 0.43 parts of hydroxygallium phthalocyanine crystal was obtained by the same treatment as in Example 1-1. The powder X-ray diffraction chart of the produced crystal was the same as in FIG. 4.

By NMR measurement, it was confirmed that 0.42% by mass of the exemplary compound (25) and 1.98% by mass of N,N-dimethylformamide were contained in the hydroxygallium phthalocyanine crystal. Since the exemplary compound (25) was a solid soluble in N,N-dimethylformamide, it was found that the exemplary compound (25) was contained in the hydroxygallium phthalocyanine crystal.

Example 1-7

Figure 5:
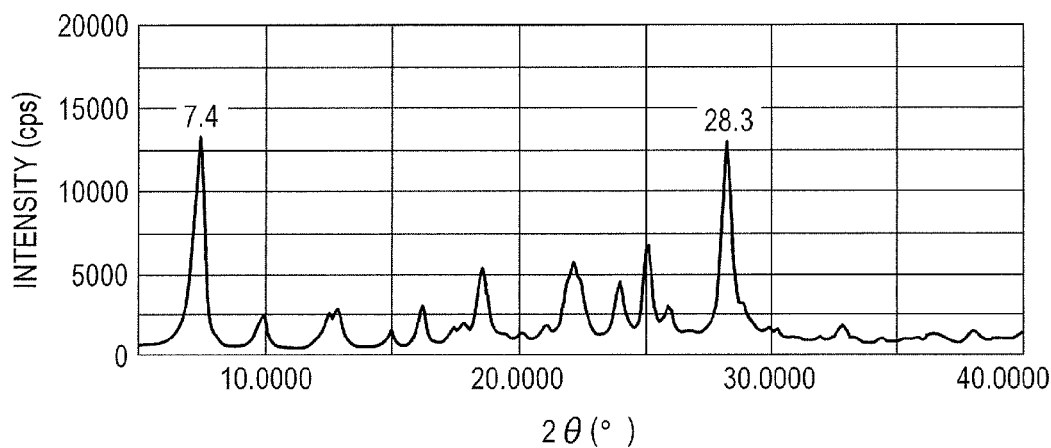
FIG. 5 is a powder X-ray diffraction chart of a hydroxygallium phthalocyanine crystal obtained in Example 1-7.

Except that N,N-dimethylformamide in Example 1-5 was replaced with dimethyl sulfoxide, 0.19 parts of hydroxygallium phthalocyanine crystal was obtained by the same treatment as in Example 1-5. The powder X-ray diffraction chart of the produced crystal is illustrated in FIG. 5.

By NMR measurement, it was confirmed that 0.95% by mass of the exemplary compound (25) and 2.09% by mass of dimethyl sulfoxide were contained in the hydroxygallium phthalocyanine crystal. Since the exemplary compound (25) was a solid soluble in tetrahydrofuran, it was found that the exemplary compound (25) was contained in the hydroxygallium phthalocyanine crystal.

The TG measurement results showed weight reduction increase at a temperature of 450° C. or higher, which is higher than the temperature range of 150° C. to 263° C. for the weight reduction due to evaporation of the exemplary compound (25) alone. It was thus found that a compound represented by the formula (1) (the exemplary compound (25)) was contained in the hydroxygallium phthalocyanine crystal produced in Example 1-7.

Example 1-8

Except that 1.0 part of the exemplary compound (7) in Example 1-1 was replaced with 1.0 part of the exemplary compound (21) (product code: M1624, made by Tokyo Chemical Industry Co., Ltd.), 0.46 parts of hydroxygallium phthalocyanine crystal was obtained by the same treatment as in Example 1-1. The powder X-ray diffraction chart of the produced crystal was the same as in FIG. 5.

By NMR measurement, it was confirmed that 1.30% by mass of the exemplary compound (21) and 2.45% by mass of N,N-dimethylformamide were contained in the hydroxygallium phthalocyanine crystal. Since the exemplary compound (21) was a solid soluble in N,N-dimethylformamide, it was found that the exemplary compound (21) was contained in the hydroxygallium phthalocyanine crystal.

Comparative Example 1-1

Figure 6:
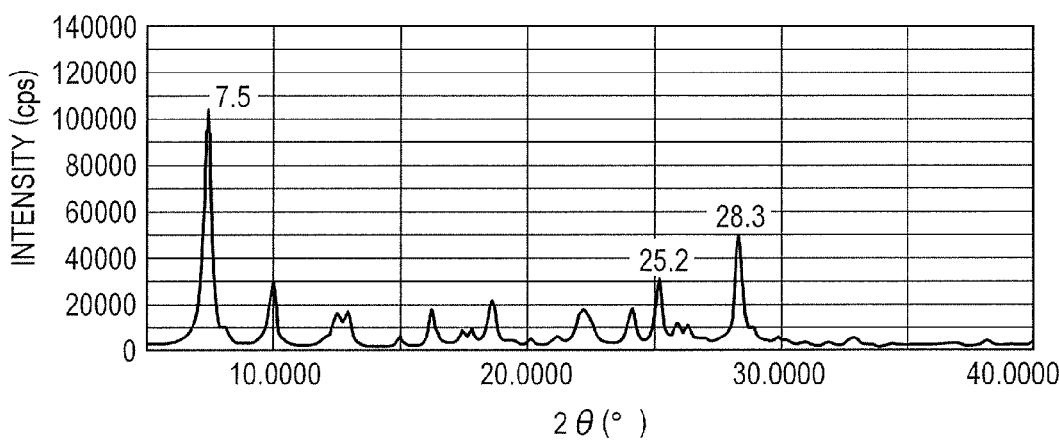
FIG. 6 is a powder X-ray diffraction chart of a hydroxygallium phthalocyanine crystal obtained in Comparative Example 1-1.

Except that 1.0 part of the exemplary compound (7) in Example 1-1 was not added, 0.4 parts of hydroxygallium phthalocyanine crystal was obtained by the same treatment as in Example 1-1. The powder X-ray diffraction chart of the produced hydroxygallium phthalocyanine crystal was illustrated in FIG. 6.

Comparative Example 1-2

Except that 1.0 part of the exemplary compound (7) in Example 1-1 was replaced with 1.0 part of piperazine, 0.45 parts of hydroxygallium phthalocyanine crystal was obtained by the same treatment as in Example 1-1.

Comparative Example 1-3

Except that 1.0 part of the exemplary compound (7) in Example 1-1 was replaced with 1.0 part of N-ethylpyrrolidine, 0.45 parts of hydroxygallium phthalocyanine crystal was obtained by the same treatment as in Example 1-1.

Comparative Example 1-4

Except that 1.0 part of the exemplary compound (7) in Example 1-1 was replaced with 0.5 parts of morpholine, 0.40 parts of hydroxygallium phthalocyanine crystal was obtained by the same treatment as in Example 1-1.

Example 2-1

Firstly, 60 parts of barium sulfate particles coated with tin oxide (trade name: Passtran PC1, made by Mitsui Mining & Smelting Co., Ltd.), 15 parts of titanium oxide particles (trade name: TITANIX JR, made by Tayca Corporation), 43 parts of a resol-type phenol resin (trade name: Phenolite J-325 made by DIC Corporation, solid content: 70% by mass), 0.015 parts of silicone oil (trade name: SH28PA, made by Dow Corning Toray Co., Ltd.), 3.6 parts of silicone resin (trade name: Tospearl 120, made by Momentive Performance Materials Inc.), 50 parts of 2-methoxy-1-propanol, and 50 parts of methanol were put in a ball mill, and dispersed for 20 hours so as to prepare a coating liquid for forming a conductive layer.

The coating liquid for forming a conductive layer was applied on aluminum cylinder (diameter: 24 mm) as a support with immersion coating, and the produced coating film was dried at 140° C. for 30 minutes so that a conductive layer having a film thickness of 15 μm was formed.

Subsequently 10 parts of copolymer nylon resin (trade name: Amilan CM8000, made by Toray Industries, Inc.) and 30 parts of methoxymethylated 6-nylon resin (trade name: Tresin EF-30T, made by Nagase Chemtex Corporation) were dissolved in a mixed solvent of 400 parts of methanol and 200 parts of n-butanol so as to prepare a coating liquid for forming an undercoat layer.

The coating liquid for forming an undercoat layer was applied to the conductive layer with immersion coating, and the produced coating film was dried so that an undercoat layer having a film thickness of 0.5 μm was formed.

Subsequently, 10 parts of the hydroxygallium phthalocyanine crystal (charge generating substance) produced in Example 1-1, 5 parts of polyvinylbutyral (trade name: S-LEC BX-1, made by Sekisui Chemical Co., Ltd.), and 250 parts of cyclohexanone were put in a sand mill with glass beads having a diameter of 1 mm for dispersion treatment for 4 hours. To the dispersion liquid, 250 parts of ethyl acetate was added to dilute it, thereby preparing a for forming a charge generating layer.

The coating liquid for forming a charge generating layer was applied to the undercoat layer with immersion coating. The produced coating film was dried at 100° C. for 10 minutes to form the charge generating layer having a film thickness of 0.16 μm.

Subsequently, 8 parts of a compound (charge transporting substance) represented by the following formula (3) and 10 parts of polycarbonate (trade name: Iupilon Z-200, made by Mitsubishi Engineering-Plastics Corporation) were dissolved in 70 parts of monochlorobenzene so as to prepare a coating liquid for forming a charge transporting layer.

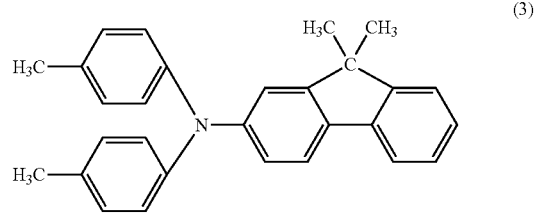 [SMILES: Cc1ccc(N(c2ccc(C)cc2)c2ccc3c(c2)C(C)(C)c2ccccc2-3)cc1]

(3)

The coating liquid for forming a charge transporting layer was applied to the charge generating layer by immersion coating. The produced coating film was dried at 110° C. for 1 hour to form a charge transporting layer having a film thickness of 23 μm.

The electrophotographic photosensitive member of Example 2-1 in a cylindrical shape (drum shape) was thus manufactured.

Examples 2-2 to 2-8

Except that the hydroxygallium phthalocyanine crystal in preparing the coating liquid for forming a charge generating layer in Example 2-1 was replaced with the hydroxygallium phthalocyanine crystals produced in Examples 1-2 to 1-8, the electrophotographic photosensitive members in Examples 2-2 to 2-8 were made in the same way as in Example 2-1.

Example 2-9

Except that 0.5 parts of the exemplary compound (25) was further added to 10 parts of the hydroxygallium phthalocyanine crystal (charge generating substance) produced in Example 1-1, 5 parts of polyvinylbutyral (trade name: S-LEC BX-1, made by Sekisui Chemical Co., Ltd.), and 250 parts of cyclohexanone in dispersing the coating liquid for forming a charge generating layer, the electrophotographic photosensitive member in Example 2-9 was made in the same way as in Example 2-1.

Comparative Examples 2-1 to 2-4

Except that the hydroxygallium phthalocyanine crystal in preparing the coating liquid for forming a charge generating layer in Example 2-1 was replaced with the hydroxygallium phthalocyanine crystals produced in Comparative Examples 1-1 to 1-4, the electrophotographic photosensitive members in Comparative Examples 2-1 to 2-4 were made in the same way as in Example 2-1.

Evaluation of the Electrophotographic Photosensitive Members in Examples 2-1 to 2-9 and Comparative Examples 2-1 to 2-4

The electrophotographic photosensitive members of Examples 2-1 to 2-9 and Comparative Examples 2-1 to 2-4 were evaluated for ghost images.

A laser beam printer made by Hewlett Packard Japan, Ltd (trade name: Color Laser Jet CP3525dn) was modified to use as an electrophotographic apparatus for evaluation. As a result of modification, a pre-exposing light was unlit and charging conditions and the amount of image exposure were variably controlled. In addition, a manufactured electrophotographic photosensitive member was mounted in a process cartridge for cyan color and attached to the station of the process cartridge for cyan, allowing for operation without mounting of process cartridges for other colors to the laser beam printer main body.

In outputting an image, the process cartridge for cyan color alone was attached to the main body so that a single color image was outputted using cyan toner alone.

The charging conditions and the amount of image exposure were adjusted such that the initial potential was set at −500V for a dark part and −100V for a light part under a normal temperature and normal humidity environment of 23° C./55% RH. In the measurement of the surface potential of a drum-shaped electrophotographic photosensitive member for potential setting, the cartridge was modified and a potential probe (trade name: model 6000B-8, made by Trek Japan Co., Ltd.) was mounted at the development position. The potential at the center of an electrophotographic photosensitive member in a cylindrical shape was measured with a surface potential meter (trade name: model 344, made by Trek Japan Co., Ltd).

Ghost images were then evaluated under the same conditions. Subsequently, a durability test was performed with 1,000 sheets of paper fed through, and ghost images were evaluated immediately after and 15 hours after the durability test. Evaluation results under a normal temperature and normal humidity environment are described in Table 1.

Subsequently, the electrophotographic photosensitive member was left to stand under a low temperature and low humidity environment of 15° C./10% RH together with the electrophotographic apparatus for evaluation for 3 days so as to evaluate ghost images. A durability test was performed with 1,000 sheets of paper fed through under the same conditions, and ghost images were evaluated immediately after and 15 hours after the durability test. Evaluation results under the low temperature and low humidity environment are also described in Table 1.

In the durability test with paper fed through, an image of character E with a coverage rate of 1% was formed on a plain paper of A4 size with cyan single color.

Ghost images were evaluated as follows.

The evaluation was performed based on the ghost images on 8 sheets in total outputted in succession in the following order: outputting a solid white image on a first sheet, outputting 4 types of ghost charts on respective 4 sheets in total, outputting a solid black image on a sheet, and outputting the 4 types of ghost charts on respective 4 sheets in total once again. The ghost chart includes 4 solid black square images of 25 mm side arranged in parallel at equal intervals in the 30 mm-width region from the starting position of printed images (10 mm from the top edge of paper) as a solid white background. In the region below the 30 mm-width region from the starting position of printed images, 4 types of halftone printing patterns were printed so as to be classified into ranks.

The 4 types of ghost charts are charts arranged in the region below the 30-mm width region from the starting position of printed images, with only difference in halftone pattern. The halftone patterns include the following 4 types:

(1) a printing pattern (laser exposing) with 1 dot and 1 space in lateral* direction;

*: The lateral direction means the scanning direction of a laser scanner (the horizontal direction of an outputted sheet).

(2) a printing pattern (laser exposing) with 2 dots and 2 spaces in lateral* direction;

(3) a printing pattern (laser exposing) with 2 dots and 3 spaces in lateral* direction; and (4) a printing pattern (laser exposing) of "keima" (similar to knight's jump) pattern (a pattern with 2 dots printed in 6 squares like the move of a "keima" piece in Japanese chess similar to the knight jump direction).

The ghost images were classified into ranks as follows. It was determined that the effect of the present invention was insufficient in the ranks 4, 5 and 6.

Rank 1: No ghosting was visible in any of the ghost charts.
Rank 2: Ghosting was vaguely visible in a specific ghost chart.
Rank 3: Ghosting was vaguely visible in any of the ghost charts.
Rank 4: Ghosting was visible in a specific ghost chart.
Rank 5: Ghosting was visible in any of the ghost charts.
Rank 6: Ghosting was sharply visible in a specific ghost chart.

TABLE 1

| | Evaluation results of ghost image | | | | | |
|---|---|---|---|---|---|---|
| | Under normal temperature and normal humidity environment | | | Under low temperature and low humidity environment | | |
| | Initial stage Ghosting rank | Immediately after durability test Ghosting rank | 15 hours after durability test Ghosting rank | Initial stage Ghosting rank | Immediately after durability test Ghosting rank | 15 hours after durability test Ghosting rank |
| Example 2-1 | 2 | 2 | 2 | 2 | 2 | 2 |
| Example 2-2 | 2 | 3 | 2 | 2 | 3 | 2 |

TABLE 1-continued

Evaluation results of ghost image

| | Under normal temperature and normal humidity environment | | | Under low temperature and low humidity environment | | |
|---|---|---|---|---|---|---|
| | Initial stage Ghosting rank | Immediately after durability test Ghosting rank | 15 hours after durability test Ghosting rank | Initial stage Ghosting rank | Immediately after durability test Ghosting rank | 15 hours after durability test Ghosting rank |
| Example 2-3 | 2 | 2 | 2 | 2 | 3 | 2 |
| Example 2-4 | 2 | 3 | 3 | 2 | 3 | 3 |
| Example 2-5 | 1 | 2 | 1 | 2 | 2 | 2 |
| Example 2-6 | 1 | 2 | 1 | 2 | 2 | 2 |
| Example 2-7 | 2 | 3 | 2 | 2 | 3 | 3 |
| Example 2-8 | 1 | 2 | 2 | 2 | 3 | 3 |
| Example 2-9 | 2 | 2 | 2 | 2 | 2 | 2 |
| Comparative Example 1-1 | 4 | 5 | 4 | 5 | 6 | 5 |
| Comparative Example 1-2 | 4 | 5 | 5 | 5 | 6 | 6 |
| Comparative Example 1-3 | 4 | 4 | 4 | 4 | 5 | 5 |
| Comparative Example 1-4 | 4 | 5 | 5 | 5 | 6 | 5 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-273729, filed Dec. 14, 2012, and No. 2013-242110, Nov. 22, 2013, which are hereby incorporated by reference herein in their entirety.

What is claimed is:

1. An electrophotographic photosensitive member comprising
a support; and
a photosensitive layer formed on the support;
wherein the photosensitive layer comprises:
a phthalocyanine crystal in which a compound represented by the following formula (1) is contained:

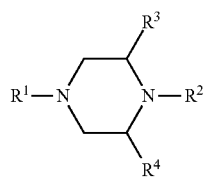

Formula (1)

wherein
the content of the compound represented by the formula (1) in the phthalocyanine crystal is 0.1% by mass or more and 3.0% by mass or less;
$R^1$ to $R^4$ each independently represent a hydrogen atom, a formyl group, an acetyl group, an alkenyl group, a substituted or unsubstituted alkyl group, a substituted or unsubstituted aryl group, or a substituted or unsubstituted heterocyclic group, and at least one of $R^1$ to $R^4$ is the substituted or unsubstituted aryl group, or the substituted or unsubstituted heterocyclic group;

the substituent of the substituted alkyl group is an alkoxy group, a morpholinoalkoxy group, a dialkylamino group, an alkoxycarbonyl group, a substituted or unsubstituted aryl group, an aryloxy group, a heterocyclic group, a halogen atom, a cyano group or a morpholino group;
the substituent of the substituted aryl group is a substituted or unsubstituted alkyl group, an alkoxy group, a dialkylamino group, an alkoxycarbonyl group, a halogen atom, a hydroxy group, a nitro group, a cyano group, a formyl group or a morpholino group; and
the substituent of the substituted heterocyclic group is an alkyl group, an alkoxy group, a dialkylamino group, an alkoxycarbonyl group, a halogen atom, a hydroxy group, a nitro group, a cyano group, a formyl group or a morpholino group,
provided that both of the $R^1$ and $R^2$ are not a hydrogen atom at the same time, and
provided that the substituent of the substituted aryl group is not an acetyl group or a benzoyl group.

2. The electrophotographic photosensitive member according to claim 1, wherein the $R^3$ and $R^4$ are each a hydrogen atom.

3. The electrophotographic photosensitive member according to claim 1, wherein the substituted or unsubstituted aryl group is a substituted or unsubstituted phenyl group, and
the substituent of the substituted phenyl group is a substituted or unsubstituted alkyl group, an alkoxy group, a dialkylamino group, an alkoxycarbonyl group, a halogen atom, a hydroxy group, a nitro group, a cyano group, a formyl group or a morpholino group.

4. The electrophotographic photosensitive member according to claim 3, wherein the substituent of the substituted phenyl group is a halogen atom, a hydroxy group, a cyano group, a nitro group, a formyl group, an alkyl group or an alkoxy group.

5. The electrophotographic photosensitive member according to claim 1, wherein the substituted or unsubstituted heterocyclic group is a substituted or unsubstituted pyridyl group, and the substituent of the substituted pyridyl group is an alkyl group, an alkoxy group, a dialkylamino group, an alkoxycarbonyl group, a halogen atom, a hydroxy group, a nitro group, a cyano group, a formyl group or a morpholino group.

6. The electrophotographic photosensitive member according to claim 5, wherein the substituent of the substituted or unsubstituted pyridyl group is a halogen atom, a hydroxy group, a cyano group, a nitro group, a formyl group, an alkyl group or an alkoxy group.

7. The electrophotographic photosensitive member according to claim 1, wherein at least one of $R^1$ and $R^2$ is the substituted or unsubstituted alkyl group.

8. The electrophotographic photosensitive member according to claim 7, wherein the substituent of the substituted alkyl group is a halogen atom, a dialkylamino group or a phenyl group.

9. The electrophotographic photosensitive member according to claim 7, wherein the $R^1$ and $R^2$ are each independently a methyl group or an ethyl group.

10. A process cartridge detachably attachable to a main body of an electrophotographic apparatus, wherein the process cartridge integrally supports: an electrophotographic photosensitive member; and at least one device selected from the group consisting of a charging device, a developing device, a transfer device and a cleaning device,
wherein the electrophotographic photosensitive member comprises:
a support; and
a photosensitive layer formed on the support;
wherein the photosensitive layer comprises:
a phthalocyanine crystal in which a compound represented by the following formula (1) is contained

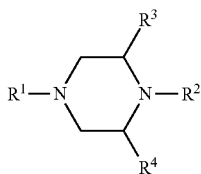

Formula (1)

wherein
$R^1$ to $R^4$ each independently represent a hydrogen atom, a formyl group, an acetyl group, an alkenyl group, a substituted or unsubstituted alkyl group, a substituted or unsubstituted aryl group, or a substituted or unsubstituted heterocyclic group, and at least one of $R^1$ to $R^4$ is the substituted or unsubstituted aryl group, or the substituted or unsubstituted heterocyclic group;
the substituent of the substituted alkyl group is an alkoxy group, a morpholinoalkoxy group, a dialkylamino group, an alkoxycarbonyl group, a substituted or unsubstituted aryl group, an aryloxy group, a heterocyclic group, a halogen atom, a cyano group or a morpholino group;
the substituent of the substituted aryl group is a substituted or unsubstituted alkyl group, an alkoxy group, a dialkylamino group, an alkoxycarbonyl group, a halogen atom, a hydroxy group, a nitro group, a cyano group, a formyl group or a morpholino group; and
the substituent of the substituted heterocyclic group is an alkyl group, an alkoxy group, a dialkylamino group, an alkoxycarbonyl group, a halogen atom, a hydroxy group, a nitro group, a cyano group, a formyl group or a morpholino group,
provided that both of the $R^1$ and $R^2$ are not a hydrogen atom at the same time, and
provided that the substituent of the substituted aryl group is not an acetyl group or a benzoyl group.

11. The process cartridge according to claim 10, wherein the content of the compound represented by the formula (1) in the phthalocyanine crystal is 0.1% by mass or more and 3.0% by mass or less.

12. An electrophotographic apparatus comprising:
an electrophotographic photosensitive member with
a charging device, an image exposing device, a developing device and a transfer device,
wherein the electrophotographic photosensitive member comprises:
a support; and
a photosensitive layer formed on the support;
wherein the photosensitive layer comprises:
a phthalocyanine crystal in which a compound represented by the following formula (1is contained

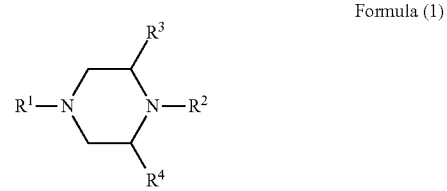

Formula (1)

wherein
$R^1$ to $R^4$ each independently represent a hydrogen atom, a formyl group, an acetyl group, an alkenyl group, a substituted or unsubstituted alkyl group, a substituted or unsubstituted aryl group, or a substituted or unsubstituted heterocyclic group, and wherein at least one of $R^1$ to R4 is the substituted or unsubstituted aryl group, or the substituted or unsubstituted heterocyclic group;
the substituent of the substituted alkyl group is an alkoxy group, a morpholinoalkoxy group, a dialkylamino group, an alkoxycarbonyl group, a substituted or unsubstituted aryl group, an aryloxy group, a heterocyclic group, a halogen atom, a cyano group or a morpholino group;
the sub stituent of the substituted aryl group is a substituted or unsubstituted alkyl group, an alkoxy group, a dialkylamino group, an alkoxycarbonyl group, a halogen atom, a hydroxy group, a nitro group, a cyano group, a formyl group or a morpholino group; and
the substituent of the substituted heterocyclic group is an alkyl group, an alkoxy group, a dialkylamino group, an alkoxycarbonyl group, a halogen atom, a hydroxy group, a nitro group, a cyano group, a formyl group or a morpholino group,
provided that both of the $R^1$ and $R^2$ are not a hydrogen atom at the same time, and
provided that the substituent of the substituted aryl group is not an acetyl group or a benzoyl group.

13. The electrophotographic apparatus according to claim 12, wherein the content of the compound represented by the formula (1) in the phthalocyanine crystal is 0.1% by mass or more and 3.0% by mass or less.

* * * * *